United States Patent [19]
Morandiere

[11] Patent Number: 5,217,676
[45] Date of Patent: Jun. 8, 1993

[54] SEALING PLUG FOR AN INTERNALLY THREADED HOLE AND TOOL AND PROCESS FOR THE FITTING OF THIS PLUG

[75] Inventor: Jean-Claude Morandiere, Vellerot, France

[73] Assignee: Framatome

[21] Appl. No.: 497,263

[22] Filed: Mar. 22, 1990

[30] Foreign Application Priority Data
Mar. 22, 1989 [FR] France .................. 89 03776

[51] Int. Cl.⁵ .............................. G21C 13/06
[52] U.S. Cl. ...................... 376/205; 376/260; 277/1
[58] Field of Search .............. 376/260, 261, 203, 204, 376/205, 206; 277/1, 9, 34; 411/19, 34, 371

[56] References Cited

U.S. PATENT DOCUMENTS

| | | | |
|---|---|---|---|
| 4,671,518 | 6/1987 | Retz | 376/203 |
| 4,758,402 | 7/1988 | Schukei et al. | 376/205 |
| 4,793,056 | 12/1988 | Kurokawa et al. | 376/260 |

FOREIGN PATENT DOCUMENTS

| | | |
|---|---|---|
| 0029956 | 11/1980 | European Pat. Off. . |
| 0187707 | 1/1986 | European Pat. Off. . |
| 1268066 | 7/1961 | France . |

Primary Examiner—Brooks H. Hunt
Assistant Examiner—Frederick H. Voss

[57] ABSTRACT

The plug (8) comprises a body in two parts (9, 10) in the form of flanges assembled together so as to be locked against rotation about their common axis and movable in axial translational motion relative to one another. A gasket (11) made of flexible material is inserted between the peripheral parts of the two flanges, and the flanges are axially clamped. The space (12) between the flanges (9, 10) can be evacuated before such clamping.

5 Claims, 6 Drawing Sheets

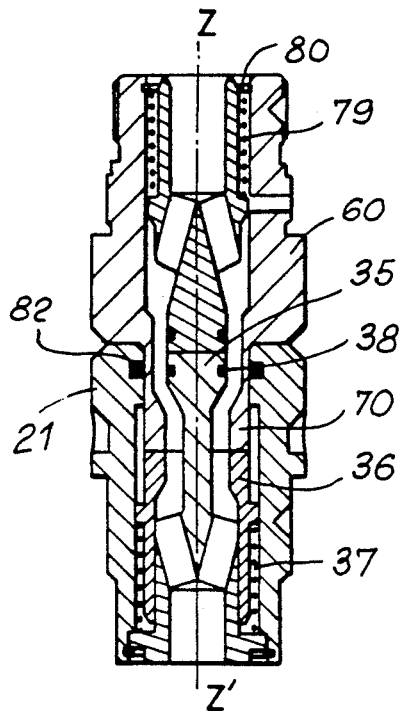
FIG.5
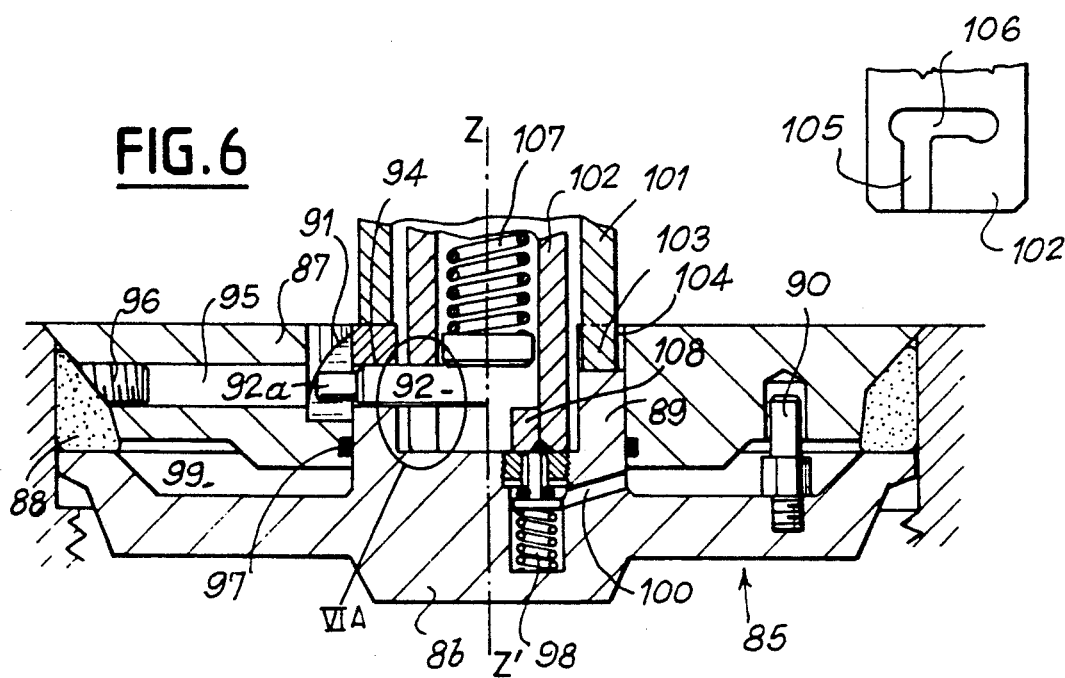
FIG.6
FIG.6A

SEALING PLUG FOR AN INTERNALLY THREADED HOLE AND TOOL AND PROCESS FOR THE FITTING OF THIS PLUG

FIELD OF THE INVENTION

The invention relates to a sealing plug for internally threaded holes, such as the holes for fastening a cover to the collar of a vessel of a pressurized-water nuclear reactor, and to a tool for the handling and fitting of this plug.

BACKGROUND OF THE INVENTION

The vessels of pressurized-water nuclear reactors have, in their upper part, a collar to which the vessel cover is fastened by means of pins engaged into holes passing through the collar of the cover and into blind internally threaded holes machined in the vessel collar. The pins are clamped by means of a set of nuts coming to bear on the upper face of the collar of the cover.

This nut/pin assembly is unscrewed and extracted from the internal threads and from the corresponding holes at certain time intervals, for the purpose of unloading and reloading the fuel and of maintaining the internal equipment.

The unloading and reloading of pressurized-water reactors normally occurs each year. This operation generally lasts for three weeks, and during this period it is expedient to protect the internal threads against introduction of foreign substances or bodies.

In most nuclear boilers, the vessel is placed inside a concrete cavity called a well. During the of the reactor, this well is emptied of water.

During the refuelling operations, the well is filled with water, in order to maintain a low radiation level in the vicinity of its upper level.

This protection, consisting of a water screen of a height of approximately eight meters, makes it possible, after removal of the cover, to extract the fuel assemblies to be replaced in the reactor core.

Likewise, this protection remains necessary for the reloading of the new assemblies in place of the spent assemblies which have been extracted. The water of the well also contains an additive in the form of boric acid, the function of which is to keep the reactor core in a subcritical state.

Before carrying out the unloading and the reloading of the fuel assemblies inside the core, it is necessary to remove the cover from the vessel. This vessel cover is usually fastened to the vessel by means of a set of pins which pass vertically through the annular collar of the cover and which engage into internally threaded blind holes located in corresponding positions on the vessel collar. There is a large number of these pins, of the order of 50 or more, depending on the type of vessel.

The vessel cover itself is removed when the well has been filled with water containing boric acid. So as to protect the internally threaded parts of the holes receiving the pins, to prevent any corrosion caused by the reactive products mixed with the water, for example boric acid, it is necessary for the bores to be protected by means of plugs.

It is known in the art to use threaded plugs which have been screwed manually into the bores. However, the fitting of these screwed plugs presents some difficulties, and the personnel responsible for these operations is therefore exposed for a considerable time to the radiation coming from the vessel.

Furthermore, the threaded plugs do not have good sealing properties, and the water containing boric acid has often been in contact with the lower part of the thread. The threaded plugs are therefore unsuitable for protecting the bore against the risks of corrosion.

To improve the sealing of the plugs introduced into the bores of the vessel collars, the sealing defects being mainly attributable to the surface irregularities of the non-threaded upper part of the bores, EP-A-0,187,707 proposed using an inflatable plug for the protection of these bores.

The plug described in this patent comprises two rigid pieces holding a U-shaped gasket. Arranged on one of the pieces is a valve making it possible to put the space defined between the two pieces and the gasket under pressure by means of compressed air. When the gasket is inflated to the desired pressure, its outer surface is in sealing contact with the non-threaded upper part of the bore to be protected. This pressure is maintained by means of a non-return valve. Leaks occur in the region of this non-return valve, and therefore the internal pressure decreases within the gasket and the requisite sealing is no longer obtained. In this case, therefore, there can also be leaks of water containing boric acid towards the inside of the bore.

Moreover, during the inflation of the plug, the air contained in the internally threaded hole is compressed, with the result that this overpressure tends to expel the plug from its receptacle.

Moreover, the upper part of the plug has an extra thickness in relation to the plane of the gasket of the vessel, thus increasing the risks that the plug will catch during the work operations. This disadvantage, combined with the overpressure generated in the bore under the plug, increases the tendency of the plug to be expelled from its receptacle.

The upper part of the plug also has a diameter larger than the diameter of the internal thread, and therefore it is not easy for the plug to be fitted remotely and there are risks that the plug will be jammed as it passes through the holes in the vessel cover.

EP-A-0029956 discloses a sealing plug for closing a threaded hole which comprises a body in two parts assembled together so as to be locked against rotation about their common axis and movable in axial translational motion relative to one another. A peripheral gasket is inserted between the two parts of the body of the plug that can be moved relatively to one another in axial translation and locked in a position in which they tighten the gasket. A tool can be connected to the plug for fitting the plug into the hole. The gasket is tightened between the two parts by a screw and nut assembly. Such a device does not allow the fitting of the plug and the tightening of the gasket to be effected correctly and remotely.

SUMMARY OF THE INVENTION

The object of the invention is, therefore, to provide a sealing plug for an internally threaded hole, such as the holes for fastening a cover to the collar of a vessel of a pressurized-water nuclear reactor, which can be fitted into the internally threaded hole easily and remotely, which ensures effective sealing and which is stable when it is put in position in the internally threaded hole, the plug comprising a body in two parts in the form of flanges the maximum outside diameter of which is less that the inside diameter of a smooth entry part of the internally threaded hole and which are assembled together so as to be locked against rotation about their common axis and movable in axial translational motion relative to one another, a gasket made of flexible material inserted between the two parts of the body in its peripheral zone, means for the relative movement and locking in axial translational motion of the two parts relative to one another, and means for connecting the plug to a handling and fitting tool.

To this end, the means for the relative movement and locking and for connecting the plug to a tool comprise:

- a central hub (16), mounted rotatably in a part of the body (9, 10) of the plug (8) about the axis of this body and having at least one catch (23, 24) for the locking of the two parts (9, 10) of the body, relative to one another in the axial direction.
- a connection (21) which is mounted in the central position in the hub (16) and an inner part of which communicates with a chamber (12) contained between the two parts of the body (9, 10) and closed on its periphery by means of a gasket (11),
- an element (36) for closing off the connection (21), returned into the closing position by means of a spring (37), and at least one gripping cavity on the outer surface of the connection (21).

According to another embodiment, the two flanges of the body of the plug are engaged on one another by means of a hub fixed to one of the flanges, and are assembled together in such a way as to delimit an inner sealing space in communication with the outer atmosphere via a valve, one of the flanges having a cam surface and the other flange an axle mounted movably in the flange and capable of interacting with the cam surface in order to obtain the clamping or unclamping of the two flanges.

The invention also relates to a tool for carrying out the handling and fitting of the sealing plug according to the invention.

BRIEF DESCRIPTION OF THE DRAWINGS

To make it easy to understand the invention, several embodiments of a sealing plug according to the invention and the tools used for carrying out the handling and fitting of these plugs will now be described by way of example, with reference to the accompanying drawings.

FIG. 5 shows a sectional view of the connection of the plug and of the corresponding connection of the tool in the opening position.

FIG. 6 shows a sectional view of an alternative embodiment of the plug in a vertical plane of symmetry.

FIG. 6A is a detailed view of part of a tool for the fitting of the plug shown in FIG. 6.

DETAILED DESCRIPTION

Figure 1:
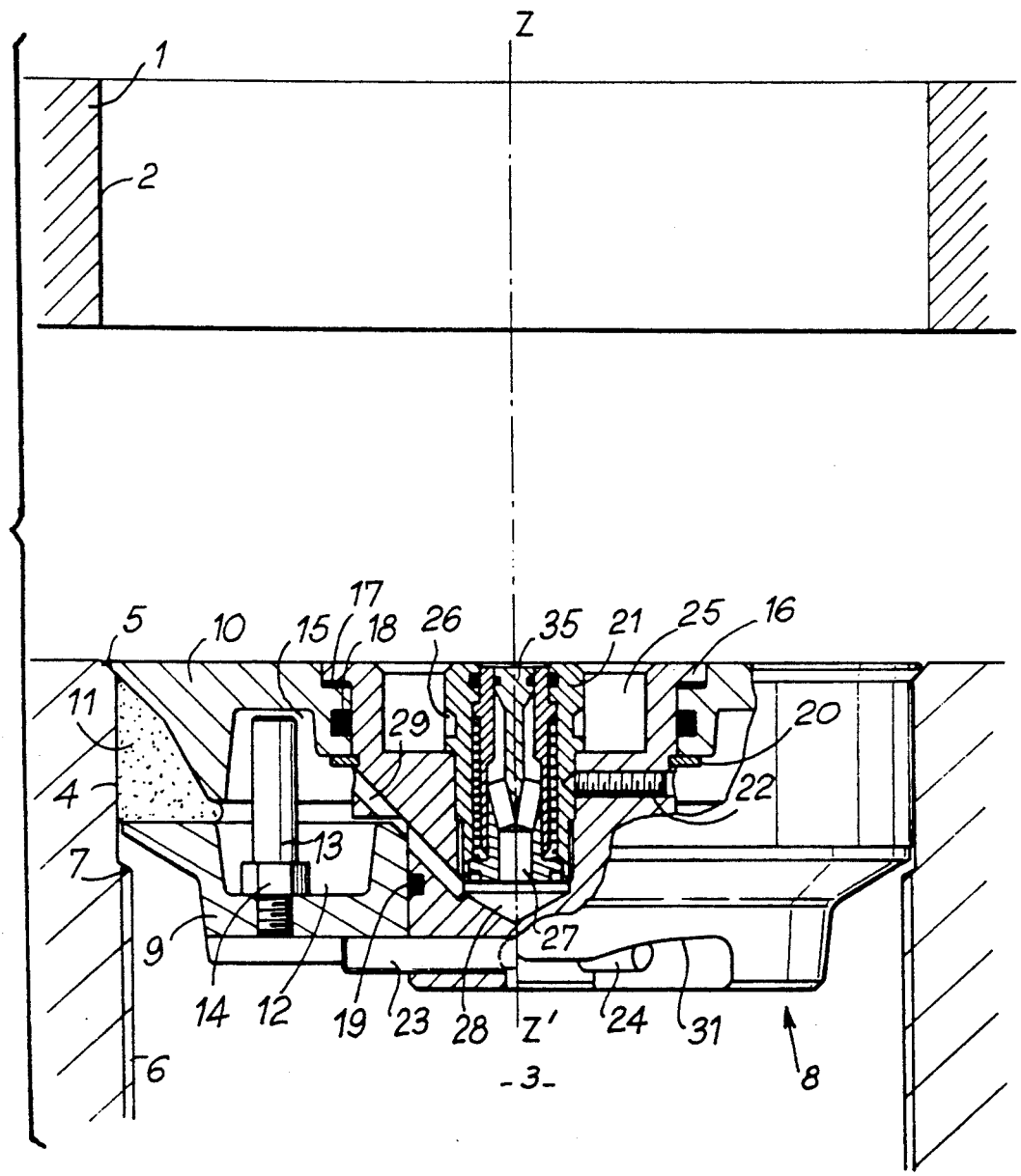
FIG. 1 is a sectional view in a vertical plane of symmetry of a plug in a closing position in an internally threaded hole of the collar of a vessel of a nuclear reactor.
Figure 2:
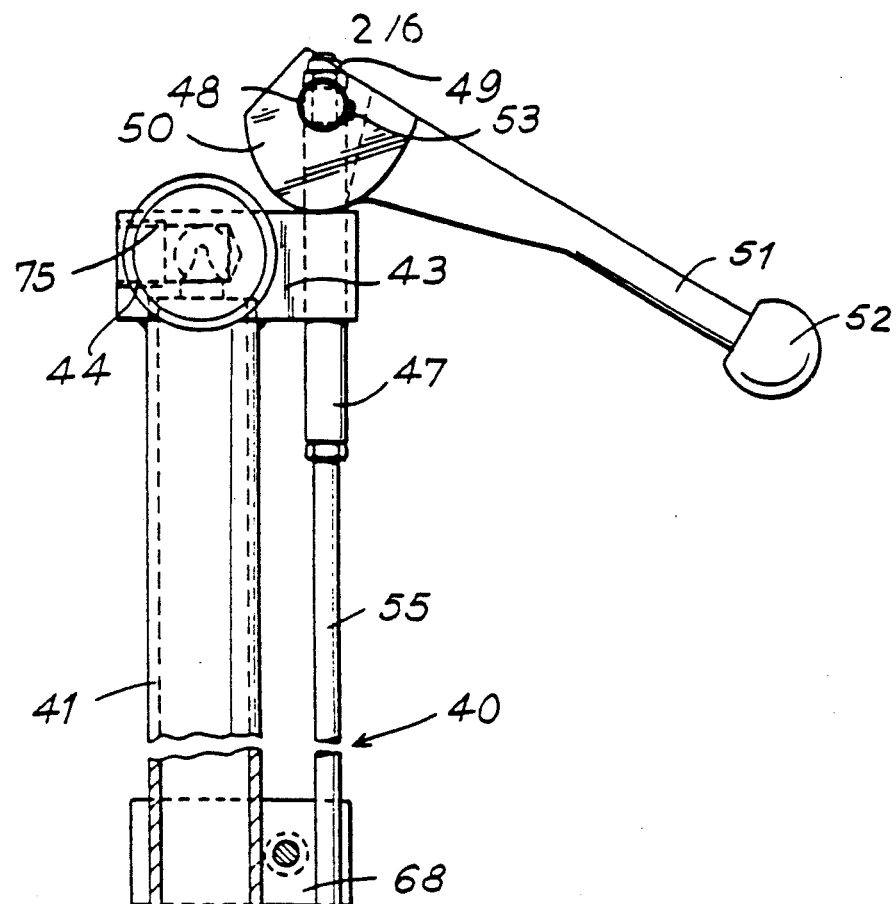
FIG. 2 is an elevation view, partly in section, of a tool for the handling and fitting of a plug according to the invention.
Figure 2:
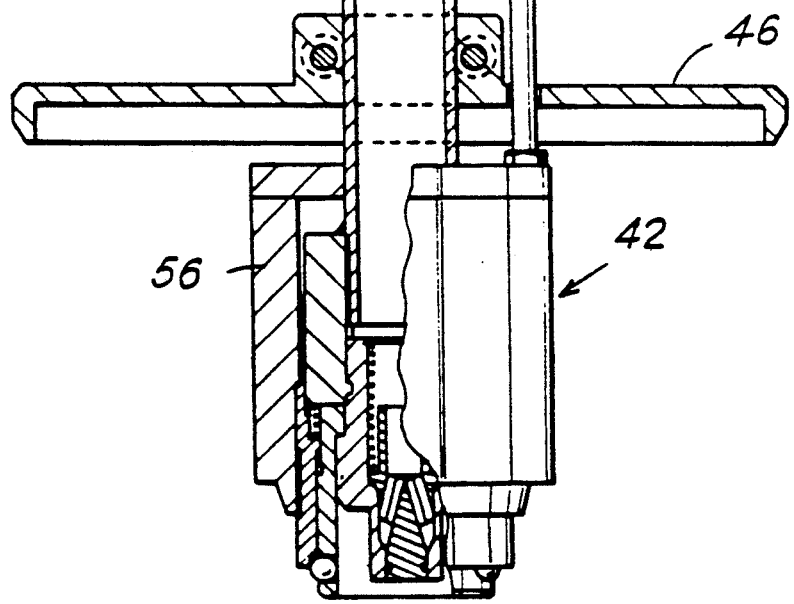

FIG. 1 shows the collar 1 of the cover of the vessel of a nuclear reactor, having a bore 2, the diameter of which is slightly larger than the diameter of the corresponding internally threaded hole 3 which is located in the vessel collar and which, in its upper portion, has a smooth part 4 terminating in a chamfer 5.

The internally threaded part 6 of the hole 3 terminates upwards in a shoulder 7 forming the first flight of the internal thread.

The plug 8 according to the invention comprises a body in two parts consisting of flanges 9 and 10 delimiting between them a peripheral space, in which is placed a gasket 11 made of flexible material.

The inner surface of the flanges 9 and 10 and the peripheral gasket 11 delimit an annular chamber 12.

The flanges 9 and 10 are connected to one another by means of an anti-rotation stud consisting of a pin 13 screwed into an internally threaded part of the lower flange 9 and locked thereon by means of a nut 14.

The upper end of the pin 13 is smooth and comes to rest in a cavity 15 in the upper flange 10. This device prevents rotation of the flanges relative to one another and allows them to move relative to one another and allows these to move nearer toward or away from one another in the axial direction.

A central hub 16 is mounted inside the flanges 9 and 10 for rotation about the axis ZZ' by means of a sliding ring 17. Gaskets 18 and 19 are interposed between the central hub and the flanges 9 and 10, respectively.

A circlip 20 fastened in a groove of the hub 16 comes to bear under a shoulder provided in the lower part of the flange 10.

A central connection 21 is fastened to the hub 16 by means of a binding screw 22.

An annular space 25 is machined in the central part of the hub 16, to make it possible to introduce a tool into cavities 26 machined in the outer surface of the connection 21.

The connection 21 has a central channel 27 which opens into a cavity 28 of the central hub 16, this cavity 28 being connected, by means of a channel 29 passing through the central hub 16, to the space 12 located between the flanges 9 and 10.

Fastened to the lower part of the central hub 16 are catches 23 and 24 interacting with circular slopes 31 machined in the lower part of the flange 9.

The device for ensuring the locking of the flanges 9 and 10 relative to one another comprises a set of catches 23 and 24.

When the central hub 16 is rotated about the axis ZZ' inside the flanges 9 and 10 by using a tool introduced into the cavities 26, it is possible to cause the locking or release of the two flanges 9 and 10 which are capable of moving toward to or away from one another, depending on the direction of rotation of the hub.

When the lower flange approaches the upper flange, these flanges ensure the compression and radial expansion of the flexible gasket 11 which thus comes up against the inner surface of the smooth part 4 of the internally threaded hole 3, to ensure the sealing.

As can be seen in FIGS. 1 and 5, the connection 21 comprises a central closing element 35 in the form of a needle surrounded by an annular fluid passage channel and a closing sleeve 36 returned by means of a spring 37 in the direction of the closing part of the closing element 35 having a gasket 38 and cooperating with the closing sleeve.

FIGS. 2, 4, 4A and 4B show a device for the handling and fitting of a sealing plug for internally threaded holes according to the invention.

The device, designated as a whole by the reference 40, comprises a tubular element 41, to the lower end of which the device for the gripping and fitting of the plugs 42 is connected.

Figure 3:
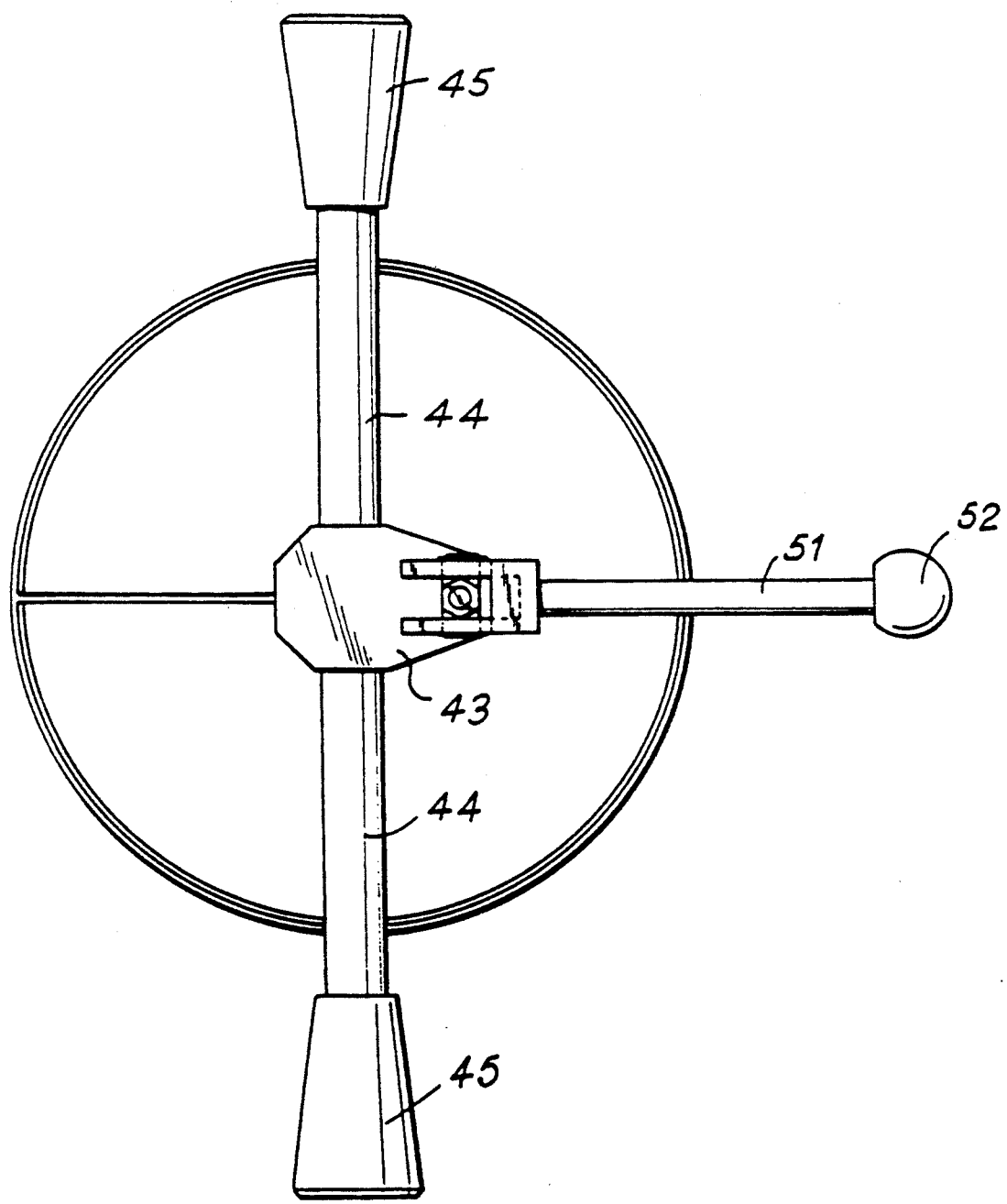
FIG. 3 is a top view of the tool of FIG. 2.

The upper end of the tubular element 41 is connected to a plate 43, to which are fastened two arms 44, which are in the extension of one another and to the end of which handles 45 are fastened (FIG. 3).

Fastened to the lower part of the tubular element 41, above the gripping device 42, is a centering means 46 making it possible to introduce the plug into the corresponding internally threaded hole through the passage hole in the collar of the vessel cover.

Also mounted in the plate 43 slidably in the axial direction of the tubular element 41 is a tie rod 47, of which the upper end located above the plate 43 is connected to a tubular axle 48 by means of a lock nut 49.

The tubular axle 48 is fastened to a cam 50 having a lever 51 equipped with a handle 52. The axle 48 is retained by means of circlips 53 engaged onto its ends on either side of the cam 50.

The tie rod 47 is extended by an actuating rod 55 which passes through the centering means 46 and which is connected, in its lower part, to a bush 56 mounted slidably on the end of the tubular element 41.

A cuff 57 is fastened to the lower end of the bush 56 by means of screws 58.

Inside the bush 56, a cuff 59 is fastened to the end of the tubular element 41 by screwing and welding.

A connection 60 is fastened inside the cuff 59 by means of a screw 61.

Figure 4:
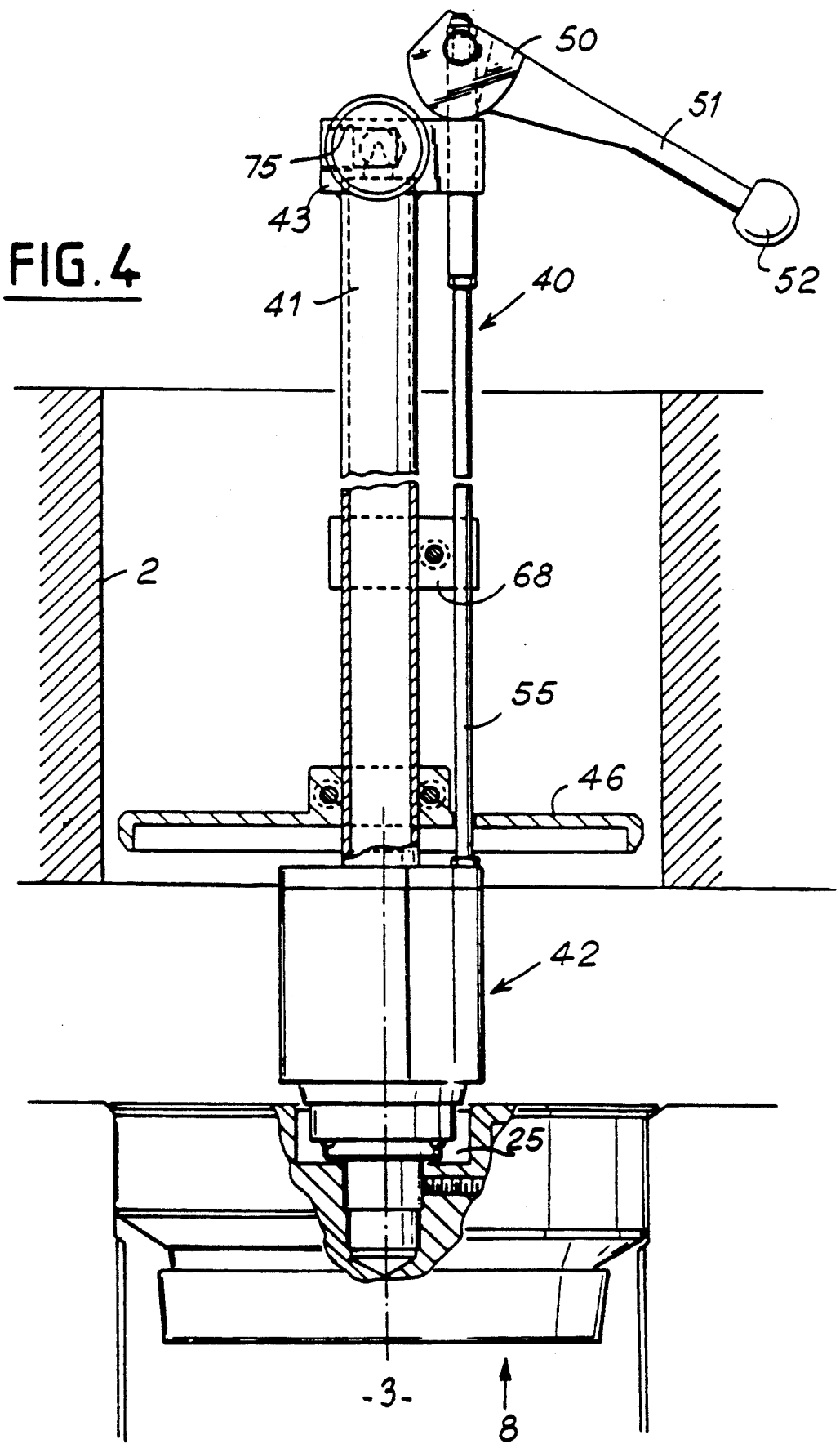
FIG. 4 is a view in partial section of the upper part of the tool for the handling and fitting of a plug according to the invention.
Figures 4A, 4B:
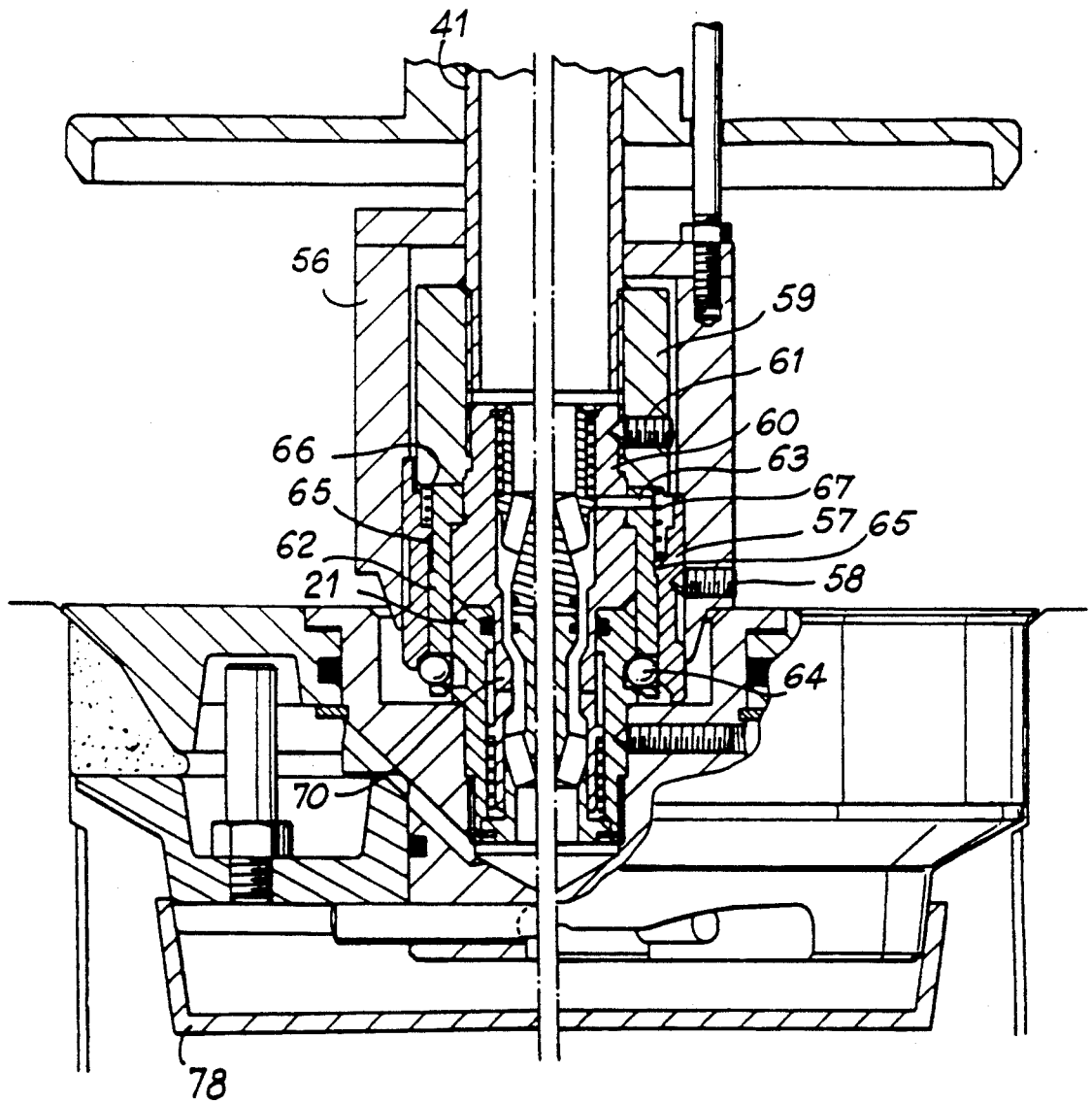
FIGS. 4A and 4B show the lower part of the tool inside the plug, in its gripping position.

The connection 60 is capable of coming in contact with the upper end of the connection 21 fastened in the central hub of the plug according to the invention, as can be seen in FIGS. 4A, 4B and 5.

A ball-carrier bush 62 comes to bear on a part of the bush 60 by means of a shoulder and is fastened to the connection 60 by means of a locking stud 63.

Balls 64 are arranged in corresponding retaining cavities at the end of the ball-carrier bush 62.

The cuff 57 slides freely on the ball-carrier bush 62 and has a part 65 which projects radially inwards and which can come to bear on a shoulder of the ball-carrier bush 62 in its low position.

In the high position, a shoulder 66 of the cuff 57 comes to bear on the lower end of the cuff 59.

In its low position, as can be seen in FIG. 4B, the cuff 57 covers the lower part of the ball-carrier bush 62 and pushes the balls 64 inwards, this position corresponding to the gripping position of the tool.

A restoring spring 67 is inserted between the lower part of the cuff 59 and that part of the cuff 57 projecting radially inwards. The spring 67 ensures that the cuff 57 is retained in the position covering the balls 64, the cuffs 56 and 57 both being in the low position.

To obtain the release of the balls which can then come into an outward retracting position, the cuff 56 fastened to the actuating rod 55 is raised by means of the tie rod 47, via the cam 50, by acting on the control lever 51. The actuating rod 55 is held in a position parallel to the tubular element 41 by means of a guide 68 which is fastened to the tubular element and in which the rod 55 slides.

Referring to FIGS. 4, 4A and 4B, it will be seen that when the tool is introduced by means of its lower gripping part into the peripheral inner space 25 of a plug 8, the end connection 60 of this tool comes in contact with the upper end of the connection 21 at the end of travel. A front central part 70 of the connection 60 has previously come in contact with the inner movable part 36 of the connection 21, returned into the high position by a spring 37. The downward movement of the tool pushes the movable part 36 downwards and exposes the peripheral channel of the connection arranged around the needle 35.

To obtain the engagement of the tool, the lever 51 of the cam 50 is held in the raised position.

After the tool has been introduced, the lever is released and the cuff 57 is pushed by the compression spring 67 into its low position ensuring the locking of the balls inside a cavity machined in the cuff 21.

The tool can then carry out the handling of the plug in order to place it in an internally threaded hole of a vessel collar, as can be seen in FIGS. 4, 4A and 4B.

The introduction of the plug into the internally threaded hole 3 is facilitated by the centering means 46 which is moved inside the bore 2 of the collar of the vessel cover 1.

Moreover, the height of the plug is less than the height of the space between the vessel cover 1 and the vessel collar in the region of the holes 2 and 3 of the cover and the vessel collar, respectively, with the result that, in the event of poor alignment between the hole 2 of the vessel cover and the internally threaded hole 3, the plug can be moved slightly and oriented so as to be introduced into the smooth part of the internally threaded hole 3.

The lower part of the tool is thus fixed to the connection 21 and the central hub 16 of the plug 8, and the space 12 located between the components 9 and 10 is in communication, via the channel 29 and the cavity 28, with the peripheral passage of the connections 21 and 60 and with the inner space of the tubular element 41.

The tubular element 41 is connected, in its upper part, to a vacuum pump which makes it possible to generate a vacuum in the space 12 between the flanges 9 and 10.

This putting under a vacuum makes it possible to lay the upper flange 10 onto the chamfer 5 of the internally threaded hole 3 and bring the lower flange 9 nearer, thereby compressing the flexible gasket 11. This produces a slight vacuum inside the internally threaded hole 3.

The clamping of the gasket can then be carried out by actuating the arms 44 fixed to the plate 55, in order to set the tubular element 41 in rotation. This setting in rotation of the tubular element 41 causes the rotation of the central hub 16 by means of the connection 21, so that the catches 23 and 24 come in contact with the inclined surface 31 of the lower flange 9.

The gasket can be clamped by rotating the two actuating arms 44 one-eighth of a revolution in the clockwise direction.

In this phase, the sealing plug 8 does not risk being driven in rotation, since the gasket 11 already exerts a pressure on the smooth zone 4 of the internally threaded hole 3 because the annular zone 12 located between the flanges 9 and 10 has been put under a vacuum.

The rotation of the tool 40 also causes the closure of the connection 21, with the result that the annular zone 12 between the flanges 9 and 12 is isolated from the outside.

The vacuum pump can then be disconnected from the offtake 75 provided in the plate 43.

When the sealing plug 8 is placed and locked in the internally threaded hole 3 of the vessel collar, the tool 40 is detached from the plug 8 by actuating the lever 51 fixed to the cam 50 in the upward direction.

As can be seen in FIG. 4A, the balls 64 then no longer project into the bore of the ball-carrier bush 62.

When the tool 40 is raised, the ball-carrier bush 62 slides on the outer surface of the connection 21, in such a way that the tool is detached from the sealing plug 8.

As can be seen in FIGS. 4A and 4B, a cover 78 can be fastened under the plug, to ensure perfect sealing of the lower flange 9 in the event of the failure of a gasket after the plug has been used several times. The cover 78 makes it possible to prevent soiling of the internal threads of the vessel in the event of a leak. Furthermore, the cover 78 makes it possible to generate a vacuum in the space 12 between the flanges 9 and 10, even if the lower gasket of the central hub 16 is worn and no longer ensures perfect sealing.

FIG. 5 shows the connections 60 and 21 in their contact position, allowing the plug to be used.

The upper connection 60 fastened to the tool 40 consists of two parts, namely an outer bush and a shutter placed in the bore of the bush. The shutter is held by means of a compression spring 79 retained by means of a circlip 80.

The plug 8 is sealed in the region of the connection 21 by means of an inner gasket 38 and an outer gasket 82.

FIG. 6 shows an alternative embodiment of a plug 85 according to the invention.

This plug comprises a lower flange 86 and an upper flange 87, between which a gasket made of flexible material 88 is inserted.

In this embodiment, the lower flange 86 has no duct and no component passing through it; the sealing of the internally threaded hole is obtained in the region of the gasket 88.

The hub 89 of the lower flange 86 is machined in the inner part of the lower flange 86 and is centered in a bore of the upper flange 87.

An anti-rotation stud 90 screwed into the lower flange 86 and introduced into a hole of the upper flange 87 prevents any relative rotational movement of the flanges in relation to one another.

Helical slopes 91 are machined in the upper flange 87, to ensure the clamping of the gasket 88. These slopes have shallow cavities for marking the locking positions.

An axle 92 having an end 92a in contact with the slopes 91 passes through the hub 89 in a radial direction. The axle 92 passes through the hub 89 in the region of horizontal grooves 94 having an angular extension about the hub of 45°-60°.

The axle 92 is introduced into the hub forming the central part of the upper flange 87 via a channel 95 closed off by means of part 96 after the passage of the axle.

A gasket 97 is inserted between the hub 89 and the bore of the upper flange 87.

A valve 98 makes it possible to ensure the passage of the residual air of the annular space 99 contained between the flanges 86 and 87 by way of the channel 100.

The shutter conversely prevents water containing boric acid from passing from the well towards the zone 99.

The gripping tool consists of two concentric tubular elements 101 and 102. The outer tubular element 101 has a lower assembly part 103 which engages into a notch 104 on the hub of the lower flange 86. The engagement part 103 of the tubular element 101 ensures the retention of the plug, to prevent it from being set in rotation.

The inner tubular element 102, part of which can be seen in FIG. 6A, has an L-shaped groove comprising a vertical engagement branch 105 and a horizontal branch 106. This L-shaped groove makes it possible to retain and actuate the axle 92 engaged in the hub.

The plug is retained by means of a thrust system 107 with a spring bearing on the axle 92, ensuring that the plug is retained on the tool when the axle 92 is engaged in the bottom of the horizontal groove 106.

The lower end of the tubular element 102 also comprises an appendage 108 intended for coming to bear on the end of the stem of the valve 98. This ensures that the space 99 is put in communication with the outside atmosphere.

When the sealing plug has been put in place in the internally threaded hole by means of the tool, the outer tubular element 101 ensures the retention of the plug against rotation, while the inner tubular element 102 is caused to rotate. This inner tubular element 102 drives the axle 92 in rotation, with the result that its end 92a comes in contact with the slope 91, so as to bring the lower flange 86 nearer to the upper flange 87, thereby subjecting the flexible gasket 88 of elastomeric material to high compression. This gasket 88 ensures the sealing of the plug in the smooth part of the internally threaded hole.

The tool is subsequently released and the valve 98 once again closes off the annular zone 99.

It will be seen that, in this alternative embodiment, there is no need to ensure that the annular chamber between the flanges is put under a vacuum.

At all events, the plug according to the invention makes it possible to ensure a sealing closure of internally threaded holes, such as those of the collar of a nuclear-reactor vessel, effectively and by remote control, thus making it possible to avoid exposing operators to a high dose of radiation.

It is possible to use other means of ensuring that the lower and upper flanges of the plug are brought nearer to one another and that these flanges are locked on one another.

It is also possible to use tools for the handling and fitting of the plug which are of a structure and a mode of operation different from those described.

The invention applies to the sealing closure of holes other than those for fastening a cover to the collar of a vessel of a pressurized-water nuclear reactor, i.e., any internally threaded holes.

I claim:

1. A plug for internally threaded holes of a pressure vessel said plug comprising
   (a) a body in two parts in the form of coaxial first and second flanges having a maximum outside diameter smaller than an inside diameter of a smooth entry part of a said internally threaded hole, said flanges being assembled together so as to be locked against rotation about their common axis and movable in axial translational motion relative to one another;
   (b) a gasket made of flexible material, inserted between said first and second flanges in a peripheral zone of said body;
   (c) a central hub mounted rotatably in a part of said body of said plug about an axis of said body and comprising at least one catch for locking said first and second flanges relative to one another in an axial direction when said first and second flanges are moved towards one another, in a position ensuring axial compression and radial expansion of said gasket which moves into abutment against said smooth entry part of said internally threaded hole to ensure sealing thereof;

(d) a connection mounted in central position in said central hub and having an inner part communicating with a chamber contained between said first and second flanges and closed on a periphery of said connection by means of said gasket, for connecting said chamber to a means for generating a vacuum in said chamber and moving said first and second flanges towards one another; and (e) an element for closing off said connection, returned into closing position by means of a spring, and at least one gripping cavity on an outer surface of said connection, for connecting said plug to a handling and fitting tool.

2. Plug according to claim 1, wherein said central hub passes axially through said first and second flanges and comprises means for axial locking relative to one of said flanges and at least one closing catch interacting with a locking surface inclined on said second flange, for selective locking and release of said first and second flanges on one another as a result of rotation of said central hub in respective clockwise and counterclockwise directions.

3. Plug according to claim 1, wherein said central hub comprises an annular cavity around said connection for introduction of a tool in gripping position into said gripping cavity of said connection.

4. Plug according to claim 1, comprising a leak-retention cover arranged along a face of a said flange directed towards the inside of said internally threaded hole.

5. A plug for internally threaded holes of a pressure vessel said plug comprising (a) a body in two parts in the form of coaxial first and second flanges having a maximum outside diameter smaller than an inside diameter of a smooth entry part of said internally threaded hole, said flanges being assembled together so as to be locked against rotation about their common axis and movable in axial translational motion relative to one another;

(b) a gasket (11, 88) made of flexible material, inserted between said first and second flanges of the body in a peripheral zone of said body;

(c) means for relative movement and locking in axial translational motion of said first and second flanges relative to one another; and (d) means for connecting said plug to a handling and fitting tool;

(e) said first and second flanges being engaged on one another by means of a hub fixed to one of said flanges and being assembled together in such a way as to delimit an inner sealing space communicating with atmosphere via a valve, one of said flanges having a cam surface and the other of said flanges having an axle mounted movably in said other flange and interacting with said cam surface for selectively clamping and unclamping said flanges.

* * * * *